United States Patent [19]
Rodriguez et al.

[11] Patent Number: 5,418,936
[45] Date of Patent: May 23, 1995

[54] DOUBLE-BUFFERED SYSTEMS AND METHODS

[75] Inventors: Louis Rodriguez; Kevin E. Deierling, both of Dallas, Tex.

[73] Assignee: Dallas Semiconductor Corporation, Dallas, Tex.

[21] Appl. No.: 277,933

[22] Filed: Jul. 5, 1994

Related U.S. Application Data

[63] Continuation of Ser. No. 628,691, Dec. 14, 1990, abandoned.

[51] Int. Cl.$^6$ ............................................. G06F 13/00
[52] U.S. Cl. .............................. 395/550; 364/DIG. 2
[58] Field of Search ......................... 395/550, 325, 775

[56] References Cited

U.S. PATENT DOCUMENTS

| | | | |
|---|---|---|---|
| 3,673,576 | 6/1972 | Donaldson, Jr. | 395/725 |
| 4,034,348 | 7/1977 | Rathbon | 364/900 |
| 4,365,291 | 12/1982 | Zanchi et al. | 364/200 |
| 4,500,953 | 2/1985 | Takezoe et al. | 364/200 |
| 4,571,602 | 2/1986 | DeSchamphelaere et al. | 346/160 |
| 4,571,603 | 2/1986 | Hornbeck et al. | 346/160 |
| 4,663,730 | 5/1987 | Ikeda | 364/900 |
| 4,931,985 | 6/1990 | Glaise et al. | 364/900 |
| 4,953,077 | 8/1990 | Alvarez, II et al. | 395/550 |
| 4,970,418 | 11/1990 | Masterson | 395/550 |
| 5,019,966 | 5/1991 | Saito et al. | 395/775 |
| 5,081,701 | 1/1992 | Silver | 395/325 |

OTHER PUBLICATIONS

Dallas Semiconductor Data Book, DS1215 and DS1217 Data Sheets, 1987-88.

The TTL Data Book, Texas Instruments, Inc. pp. 7-460 to 7-464, 1980-81.

Primary Examiner—Thomas G. Black
Assistant Examiner—Peter Y. Wang
Attorney, Agent, or Firm—Worsham, Forsythe, Sampels & Wooldridge

[57] ABSTRACT

A low-power timekeeping integrated circuit, using a double-buffered memory architecture: The user can freely read from user memory at any time, and an internal clock periodically updates a set of timekeeping registers. Transfer from the timekeeping registers to user memory (for update of the data) is performed as a block transfer, asynchronously and invisibly to the user. A special timing-window requirement is used to avoid access collision problems: each edge of the one-hertz oscillator signal is delayed slightly, and it is the delayed signal which actually clocks the update to the timekeeping registers. After a further small delay (long enough to allow for worst-case ripple-through delays in the timekeeping registers), a latched signal (NO_RIPPLE, in the presently preferred embodiment) is driven active. The signal NO_RIPPLE shows that any rippling has been completed and that access is safe. Thus, transfer will occur or not, but will never be cut short. When the user attempts to access the chip, the logic signal NO_RIPPLE is sampled. If NO_RIPPLE is not active, no transfers from timekeeping registers to the user memory is permitted, for as long as the user is accessing the chip. Whenever the user finishes an access, an update is automatically activated. Thus, in this scheme, the chip logic, while avoiding any updating during an access, will always provide the most current data into the user accessible registers, whenever possible.

43 Claims, 6 Drawing Sheets

DOUBLE-BUFFERED SYSTEMS AND METHODS

This application is a continuation of U.S. application Ser. No. 07/628,691, filed on Dec. 14, 1990, now abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO OTHER APPLICATIONS

The following application of common assignee contains related subject matter, and is believed to have an effective filing date identical with that of the present application:

Ser. No. 628,693, filed Dec. 14, 1990, entitled "POWER-UP CIRCUIT" (DSC-186), now abandoned; which is hereby incorporated by reference.

BACKGROUND AND SUMMARY OF THE INVENTION

The present invention relates to low-power integrated circuits generally, and particulary to timekeeping circuits.

The presently preferred embodiment is a serial timekeeping chip, which can be accessed by a user, over a serial bus, to get clock and calendar information. The disclosed innovations will therefore be described in the context of that chip. However, it must be appreciated that the disclosed innovations are not by any means limited to such a context.

In describing the disclosed innovations, reference will be made to two earlier integrated circuits, the DS1215 and the DS1287. These two chips were milestones in the development of low-power timekeeping ICs. Data sheets for both these chips appeared in the 1987–88 Dallas Semiconductor Data Book. This data book appeared more than one year before the filing of the present application, and thus this data book and the DS1215 and DS1287 chips (at least in their then-current versions) are believed to be prior art to the present application. These data sheets, and the chips therein described, are hereby incorporated by reference.

Architecture of a Double-Buffered Timekeeping Chip

Figure 1A:
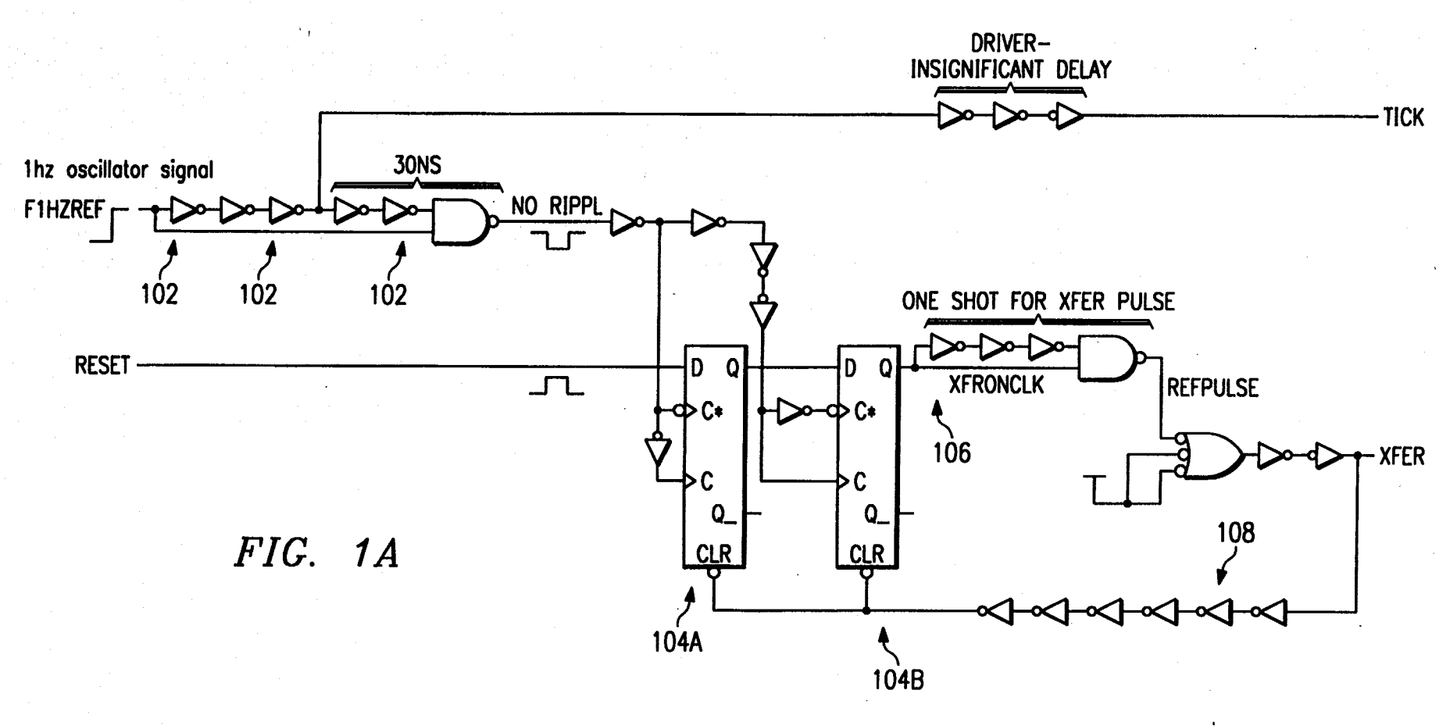
FIG. 1A is a simplified circuit diagram, showing principal features of the transfer arbitration circuit of the presently preferred embodiment.
Figure 1B:
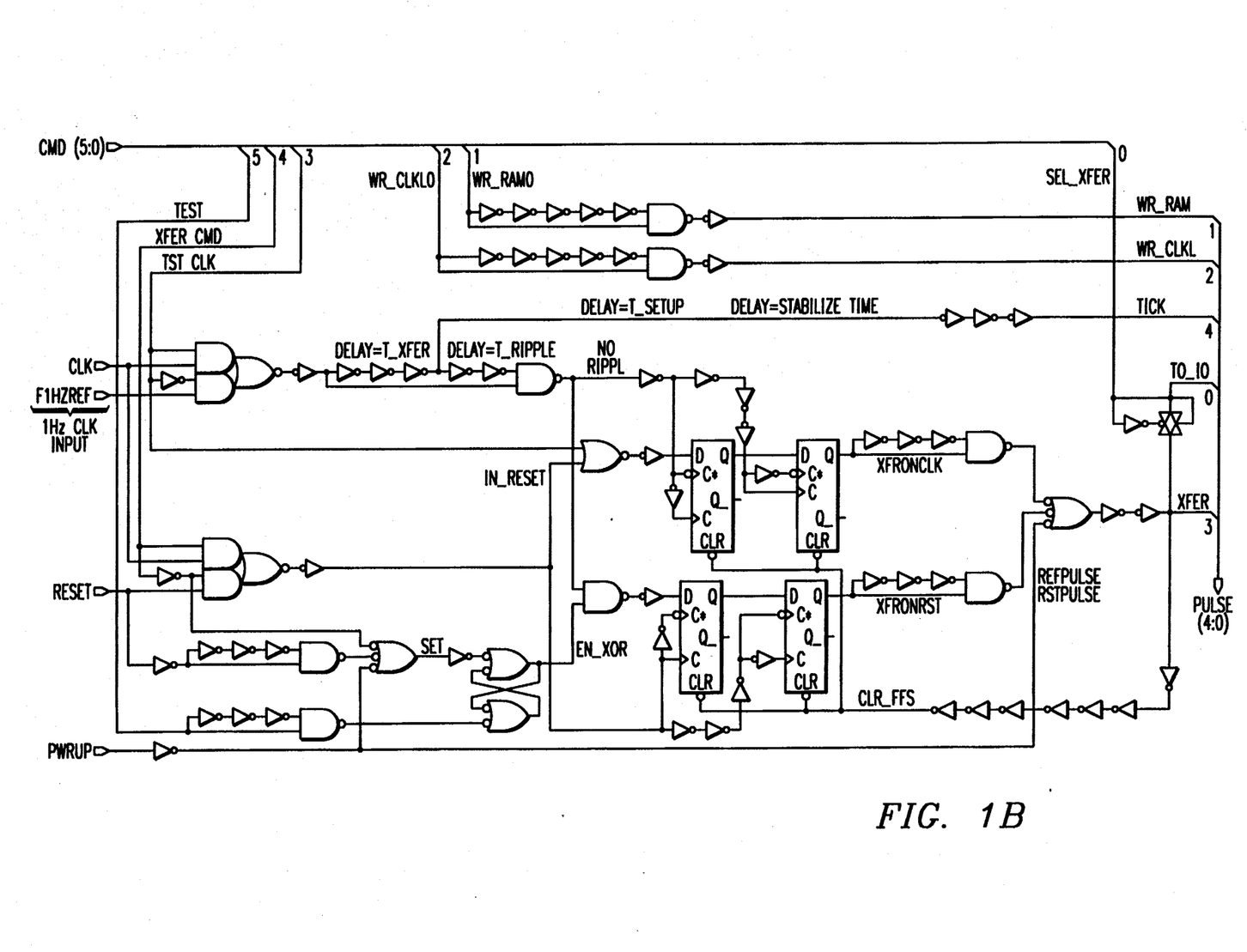
FIG. 1B is a more detailed diagram showing the actual implementation of the presently preferred best mode.
Figure 1C:
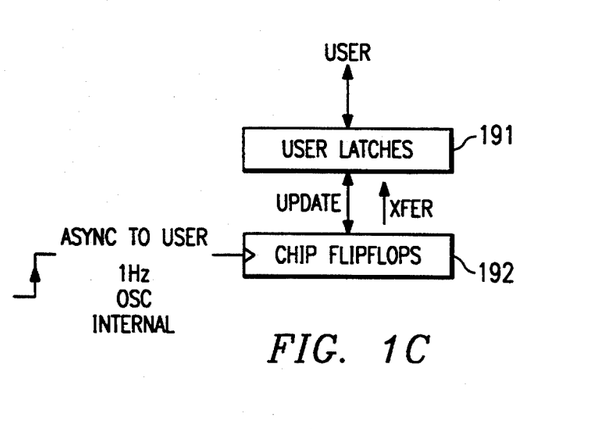
FIG. 1C is a high-level schematic representation of the relation between the user-accessible memory and the counter chain which is driven by the 1 Hz oscillator.

FIG. 1C is a high-level schematic representation of the user interface to a double-buffered timekeeping chip. Latches 191 provide user-accessible memory. The external person or system which accesses the timing information is referred to as the "user": this may be an operation instigated by a human (e.g. resetting the date or time), or may be an automatic operation (for example, a date-fetch operation commanded by software running on the CPU of a personal computer system which includes a timekeeping chip as described herein).

Counter chain 192 is clocked by a digital signal derived from an oscillator, and stores data bits corresponding to the time and date information. When the flip-flops in the counter chain 192 have been updated, a parallel transfer can be performed to transfer the correct data values into the user-accessible latch 191.

The user can read or write time and date information, at any time, by accessing the user latches 191. However, as noted above, it is important to avoid access collisions between access by the user and the periodic updates which are initiated by a clock pulse into the counter. The present invention provides new ways to avoid such collisions.

Data Transfer Between Clock and User

In a state-of-the-art low-power timekeeping circuit, the clock will be running asynchronously to the user's access requests. The operation of the clock must never (normally) be halted, but the user must be able to read and write the data in the clock/calendar registers.

Use of Double-Buffered Architecture in Timekeeping Chips

The DS1215 and DS1287 use a double-buffered memory architecture: The user can freely read from memory. Transfer from the timekeeping registers to user memory (for update of the data) is done by a block transfer, once per second. Transfer from user memory to the timekeeping registers (to reset the time or calendar value) is also done by a block transfer.[1]

[1] In the DS1287, this is implemented using a special kind of dual-port hardware architecture. Each cell in the memory array includes two latches (each accessible to only one port), and transfer circuits which can transfer the data between the two latches (in either direction).

This double-buffered architecture has some potential for conflict: what happens when an update transfer starts to occur just as a user read is starting?

In the DS1215 circuit, any updating transfer is immediately aborted when the user begins a read access. This has the potential to cause problems: for example, a sufficiently short aborted transfer might transfer "0" bits but not "1" bits.[2]

[2] In the DS1215, a pulse on the system-clock line "SYSCLK" is generated, by the timekeeping circuits, approximately every 10 milliseconds. (The long-term average of the frequency is exactly 100 Hz, but the individual pulse delays include some jitter, and are therefore not easy to predict.) Each pulse is about 244 μsec wide. The falling edge of each pulse clocks the flip-flops in the counter chain. After a delay of about another 244 μsec (which is long enough to ensure that any carries have propagated all the way through the counter chain), a pulse then appears on the "FF2L" line, to enable transfers from the flip-flops to the latches. The user must provide a 64-bit protocol to obtain access to the latched data. If the user successfully completes this, then the rising edge of the last WE* signal will set an access-OK signal "ACCOK" (driven by a flip-flop). The FF2L signal is statically decoded by logic which is conditioned on ACCOK being inactive. Thus, if ACCOK changes within two gate delays after a pulse on FF2L begins, it is possible for a "sliver" to occur, which could cause incomplete transfer.

The DS1287 provides user control over transfer blocking on read: the user can drive a Transfer-Enable bit, to block transfers.[3] However, this imposes an additional software overhead burden on the host system. (The 1287 does provide automatic transfer blocking when the user is writing, but not when the user is reading.)

[3] "The time and calendar information is obtained by reading the appropriate memory bytes. The time, calendar and alarm are set or initialized by writing the appropriate RAM bytes . . . Before writing the internal time, calendar, and alarm registers, the SET bit in Register B should be written to a logical 1 to prevent updates from occurring while access is being attempted . . . The SET bit in Register B should be cleared after the data mode bit has been written to allow the real time clock to update the time and calendar bytes ... The time, calendar, and alarm bytes are always accessible because they are double buffered ... If a read of the time and calendar data occurs during an update, a problem exists that seconds, minutes, hours, etc. may not correlate. "UPDATE CYCLE: The DS1287 executes an update cycle once per second regardless of the SET bit in Register B. When the SET bit in Register B is set to 1, the user copy of the double-buffered time, calendar, and alarm bytes is frozen and will not update as the time increments. However, the time countdown chain continues to update the internal copy of the buffer. This feature allows time to maintain accuracy independent of reading or writing the time, calendar, and alarm buffers and also guarantees that time and calendar information are consistent ... "There are three methods which can be employed to handle access of the real time clock which avoids any possibility of accessing inconsistent time and calendar data. The first method uses the update-and-interrupt. If enabled, an interrupt occurs after every cycle, which indicates that over 999 msec are available to read valid time and data information ... If this interrupt is used, the IRQF bit in Register C should be cleared through. "A second method uses the update in progress bit (UIP) in Register A to determine if the update cycle is in progress. The UIP bit will pulse once per second. After the UIP bit goes high, the update transfer occurs 244 microseconds later. If a low is read on the UIP bit, the user has at least 244 microseconds before the time/calendar data will be changed. Therefore, the user should avoid interrupt service routines that would cause the time needed to read valid time/calendar data to exceed 244 microseconds. "The third method uses a periodic interrupt to determine if an update cycle is in progress. The UIP bit in Register A is set high between the setting of the PF bit in Register C. Periodic interrupts that occur at a rate of greater than $t_{BUC}$ allow valid time and data information to be reached at each occurrence of the periodic interrupt. The reads should be complete within ($t_{PI/2}+t_{BUC}$) to insure that data is not read during the update cycle." 1987–88 *Dallas Semiconductor Data Book*, DS1287 data sheet, at 263–266.

Innovative Timing Dependency of Data Transfer

The disclosed invention avoids problems of read access collision by setting up a timing window, with timing conditions which guarantee that a read access collision can never occur. The signal which enables or inhibits transfer is a latched signal, rather than a gated signal. This is believed to provide a substantial advantage over the prior art: transfer will occur or not, but will never be cut short.

The actual time data is kept in a long chain of flip-flops, which are gated by a one-hertz oscillator signal. The oscillator signal can be produced by a variety of timing circuits. See, for example, U.S. Pat. No. 4,871,982 (DSC-74A), which is hereby incorporated by reference. The logic delay time for the update to ripple through the chain of flip-flops, in the worst possible case (of data condition, temperature, and permissible processing variation), is on the order of 20 nanoseconds in the presently preferred embodiment.

This chain of flip-flops is connected to transfer data in parallel to the user-accessible latches. Thus, if such a parallel transfer occurs during the ripple-through delay time in the flip-flop chain, it is possible for an inconsistent data state to be transferred.

To avoid this, in the presently preferred embodiment, each edge of the one-hertz oscillator signal (which, in the attached drawings, is referred to as "F1HZREF") is delayed by about 40 nanoseconds to produce a signal called TICK, which actually clocks the ripple counter. After a further delay of about 40 nanoseconds, a signal "NO_RIPPLE" is driven high.[4] The signal NO_RIPPLE shows that any rippling has been completed and that access is safe. When the signal F1HZREF goes low, the signal NO_RIPPLE is also immediately driven low.

[4] The signal NO_RIPPLE provides a window around the rising edge of TICK:

the delay before the rising edge of TICK prevents any update (caused by user reset) from occurring just before a tick;

the delay after the rising edge of TICK prevents any update (caused by the 1 Hz oscillator) from occurring while the timekeeping registers are still rippling. Otherwise, if an update occurred just before or simultaneously with a tick, then rippling (inconsistent) data might be transferred.

When the user attempts to access the chip by driving the external RST* line high, a delay of about 30 nanoseconds is interposed before an internal reset-bar signal is driven high. User access is not actually permitted until the internal reset signal goes high.

Moreover, when the external reset signal goes high, the logic signal NO_RIPPLE is sampled by a flip-flop. If NO_RIPPLE is not high, the transfer signal ("XFER"), which activates parallel transfer from the chip flip-flops to the user latches, is killed. This signal remains inactivated for as long as the external reset stays high.

Whenever external reset goes low, the XFER signal is activated. This automatically activates an update. Thus, in this scheme, the chip logic, while avoiding any updating during an access, will always provide the most current data to the user accessible registers, whenever possible.

From the user's viewpoint, there are two ways an XFER pulse can occur:

1) at scheduled times, as determined by the 1 Hz oscillator: this is asynchronous to the user.
2) after the user resets the part: this is asynchronous to the 1 Hz oscillator. This prevents data corruption by the user, and ensures that the time will always be current, except when updates must be suppressed to avoid collisions.

One of the innovative teachings is that the timing control information is sampled by a D-flip-flop, and after a short delay the signal is sampled again by another D-flip-flop. The output of the second flip-flop (if it goes high) activates a one-shot circuit to generate the actual XFER pulse. However, if the output of the second flip-flop stays low, no pulse is generated. These two flip-flops are cleared by a delayed version of the XFER pulse. Thus, if the XFER pulse does occur, it is guaranteed to occur after the clock data is stable. Moreover, this arrangement assures that the XFER pulse will never be cut short.

BRIEF DESCRIPTION OF THE DRAWING

The present invention will be described with reference to the accompanying drawings, which show important sample embodiments of the invention and which are incorporated in the specification hereof by reference, wherein:

FIGS. 4–7 illustrate data transfer operations in the serial timekeeper chip embodiment of FIG. 3.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Preferred Embodiment of the Invention

FIG. 1C is a high-level schematic representation of the relation between the user-accessible memory and the counter chain which is driven by the 1 Hz oscillator. The external person or system which accesses the timing information is referred to as the "user": this may be an operation instigated by a human (e.g. resetting the date or time), or may be an automatic operation (for example, a date-fetch operation commanded by software running on the CPU of a personal computer system which includes a timekeeping chip as described herein).

A chain of flip-flops 192 provides a counter chain, which is clocked by a 1 Hz digital signal derived from an oscillator. This counter chain stores data bits corresponding to the time and date information. (This information is stored in a binary-coded-decimal (BCD) format, in the presently preferred embodiment.) Under the worst-case conditions of permissible manufacturing variation, supply voltage variation, and normal temperature range, the maximum delay for an update to ripple through this chain of flip-flops will be about 40 nanoseconds. When the flip-flops 192 have been updated, a parallel transfer can be performed to transfer the correct data values into the user-accessible latch 191.

The user can read or write time and date information, at any time, by accessing the user latches 191. However, as noted above, it is important to avoid access collisions between access by the user and the periodic updates which are initiated by a pulse from the 1 Hz oscillator.

Figure 2A:
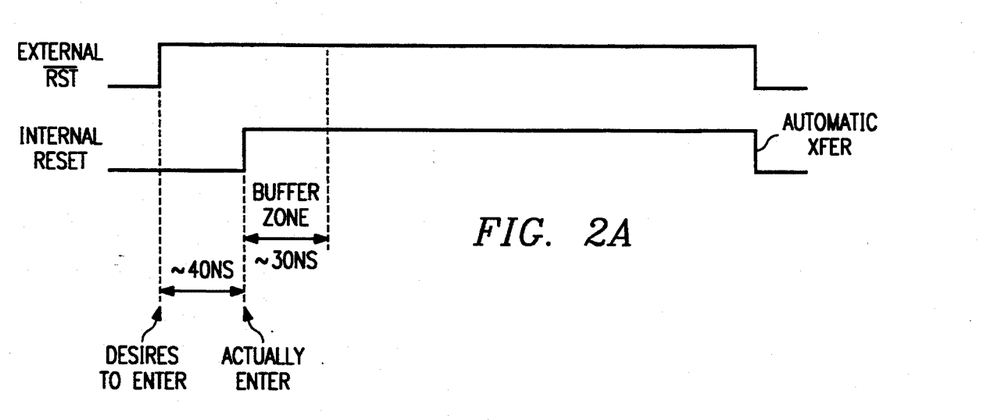
FIG. 2A is a schematic timing diagram which shows the delays following an externally received high level on the reset-bar line.
Figure 2B:
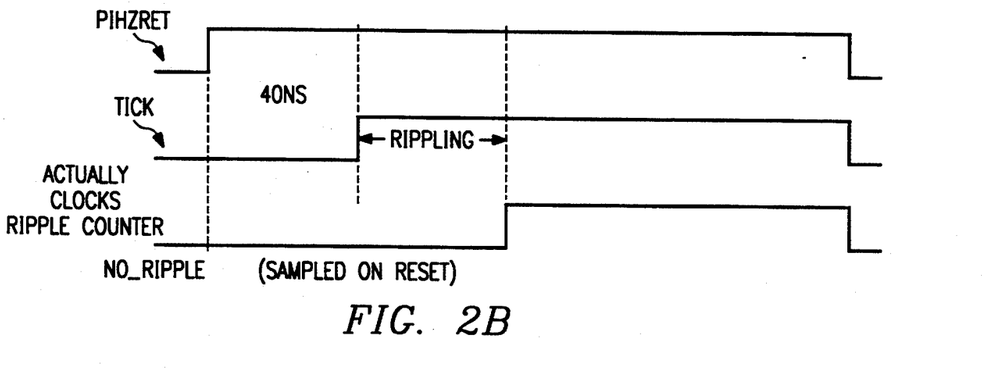
FIG. 2B is a schematic timing diagram which shows how the 1-Hz internally generated clock signal is delayed to provide a signal indicating that transfer is allowed.

FIG. 2B is a schematic timing diagram which shows how the 1-Hz internally generated clock signal is delayed to provide a signal indicating that transfer is allowed. A typical delay of about 40 ns, in the presently preferred embodiment, is interposed after signal F1HZREF goes high. A signal TICK then goes high, and this signal actually provides the input to the counter chain. Finally, after a further typical delay of 30–40 ns, a signal NO_RIPPLE goes high, to indicate that the counter chain 192 is done rippling (i.e. has returned to a stable state). When the signal F1HZREF goes low, both TICK and NO_RIPPLE promptly go low also.

FIG. 2A is a schematic timing diagram which shows the delays following an externally received high level on the reset-bar line. This high level indicates that the user (i.e. the external system) desires access to the data storage locations 191 on the timing chip. The internal signal RESET generally corresponds to signal RST/, but a delay of about 40 ns, in the presently preferred embodiment, is imposed after RST / changes state before RESET changes state. When RST / drops, RESET changes state shortly thereafter.

FIG. 1A is a simplified circuit diagram, showing principal features of the transfer arbitration circuit of the presently preferred embodiment, and FIG. 1B is a more detailed diagram showing the actual implementation of the presently preferred best mode.

In FIG. 1A, signal F1HZREF is the 1 Hz signal from the oscillator circuitry. The RESET line is an internal line, corresponding (with inversion and some delay) to the external RST* line.

One-shot 102 receives signal F1HZREF, and accordingly generates a signal NO_RIPPLE which is applied to clock flip-flops 104A and 104B. The RESET signal is applied to these flip-flops successively,[5] and the resulting signal drives one-shot 106. The pulsed output of 106 is buffered to provide signal XFER. Note that signal XFER is connected back through inverter chain 108 to reset the flip-flops 104A and 104B.

[5] The RESET signal is connected to the D input of 104A, the Q output of 104A is connected to the D input of 104B, and the Q output of 104B is connected to drive one-shot 106.

Signal TICK is a delayed version of F1HZREF. FIG. 1B is a more detailed diagram showing the actual implementation of the presently preferred best mode. Note that a signal TST_CLK permits the signal CLK to be substituted for F1HZREF in test mode. (This permits rapid clocks to be used for testing.)

Preferred Subsystem Context for Using the Invention

The preferred integrated circuit embodiment, in which the disclosed innovative circuitry is used to provide a serial timekeeper chip, will now be described in detail. These details merely represent a contemplated example of making and using the claimed inventions, and are not all necessary for practicing the claimed inventions.

Features

Some distinctive features of the preferred serial timekeeper chip include the following:

Real Time clock counts seconds, minutes, hours, date of the month, month, day of the week and year with Leap Year compensation 24×8 RAM for scratch pad data storage Serial I/O for minimum pin count 2.5 volt clock operation Uses less than 1 μA at 3 volts Single byte or multiple byte (burst mode) data transfer for read or write of clock or RAM data 8-pin DIP or optional 16-pin SOIC for surface mount Simple 3-wire interface TTL compatible ($V_{cc}=5$ V)

Pin Connections

The presently preferred best mode integrated circuit embodiment uses an 8-pin DIP package, with the following pins. An asterisk (*) represents a complemented or inverted signal.

N.C. — No Connection
X1, X2 — 32.768 kHz Crystal Inputs
GND — Ground
RST* — Reset
I/O — Data Input/Output
SCLK — Serial Clock
VCC — Power Supply Pin

General Features

The chip contains a RealTime Clock/Calendar, 24 bytes of static RAM, and communicates with a microprocessor via a simple serial interface. The RealTime Clock/Calendar provides seconds, minutes, hours, day, date, month, and year information. The end of the month date is automatically adjusted for months with less than 31 days, including corrections for Leap Year. The clock operates in either the 24-hour or 12-hour format with an AM/PM indicator. Interfacing the Serial timekeeper chip with a microprocessor is simplified using synchronous serial communication. Only three wires are required to communicate with the Clock/RAM: (1) RST* (Reset), (2) I/O (Data line), and (3) SCLK (Serial Clock). Data can be transferred to and from the Clock/RAM one byte at a time or in a burst of up to 24 bytes. The Serial timekeeper chip is designed to operate on very low power and retain data and clock information on less than 3 microwatts.

Operation

Figure 3:
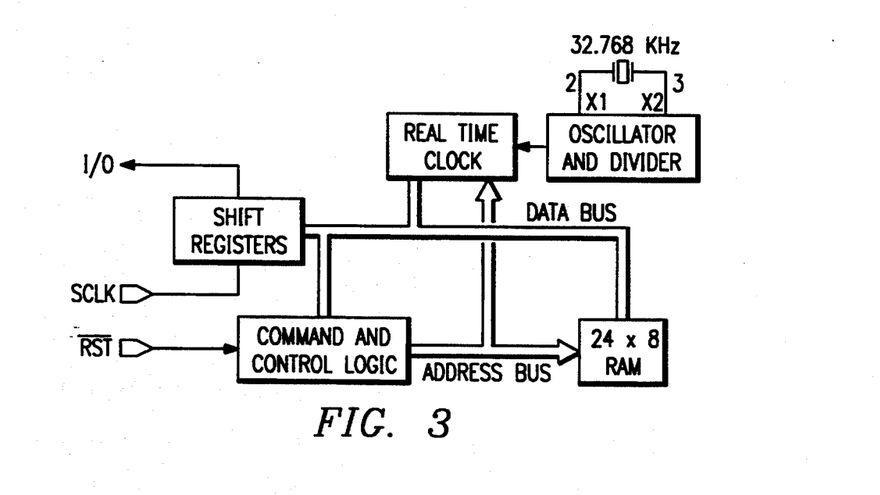
FIG. 3 shows the main elements of the serial timekeeper chip embodiment.

The main elements of the serial timekeeper chip are shown in FIG. 3, namely, shift register, control logic, oscillator, real time clock and RAM. To initiate any transfer of data, RST* is taken high and eight bits are loaded into the shift register providing both address and command information. Each bit is serially input on the rising edge of the clock input. The first eight bits specify which of 32 bytes will be accessed, whether a read or write cycle will take place, and whether a byte or burst mode transfer is to occur. After the first eight clock cycles have occurred which load the command word into the shift register, additional clocks will output data for a read, or input data for a write. The number of clock pulses equals eight plus eight for byte mode or eight plus up to 192 for burst mode.

Command Byte

Each data transfer is initiated by a one byte input called the address/command byte. The format of the address/command byte is shown in Table 1.

As defined, the MSB (Bit 7) must be a logical one. If zero, further action will be terminated. Bit 6 specifies a clock/calendar register if logic zero or a RAM location if Logical One. Bits one through five specify the designated registers to be input or output and the LSB (Bit 0) specifies a write operation (input) if logical zero or read operation output if logical one. To initiate any write operation, the write protect bit must be set to zero.

Burst Mode

Burst Mode may be specified for either the clock/calendar or the RAM registers by initiating a burst mode command. Bit 6 specifies clock or RAM and bit 0 specifies read or write. There is no data storage capacity in the Clock/Calendar or in the RAM for command bytes.

TABLE 1

| FUNCTION | COMMAND ADDRESS (HEX) | WRITE = W READ = R | RANGE - DATA MODE BCD | REGISTER DEFINITION 7 6 5 4 3 2 1 0 | INITIAL POWER ON STATUS |
|---|---|---|---|---|---|
| SECONDS | 80<br>81 | W<br>R | 00–59 | CH \| 10 SEC \| SEC | 80 |
| MINUTES | 82<br>83 | W<br>R | 00–59 | 0 \| 10 MIN \| MIN | 00 |
| 12 HR<br>24 HR | 84<br>85 | W<br>R | 01–12 (12 HR)<br>00–23 (24 HR) | 12/24 \| 0 \| A/P / 10 \| HR \| HR | 00 |
| DATE | 86 | W | 01–31 | 0 0 10 DATE DATE | 01 |

Write Protect Command Byte

Before any write operation to clock/calendar or RAM, the write protect bit must be set to zero. This operation requires driving the RST* high and the write protect command, $8E_H$, is loaded into the shift register followed by eight bits, $00_H$. RST* must be driven before any other command can be initiated. To restore write protect, drive RST* high followed by WRITE command byte, $8E_h$, and data byte $80_H$. Sixteen clock cycles are required for this operation. Complete the operation by driving RST* low.

Reset And Clock Control

Figure 4:
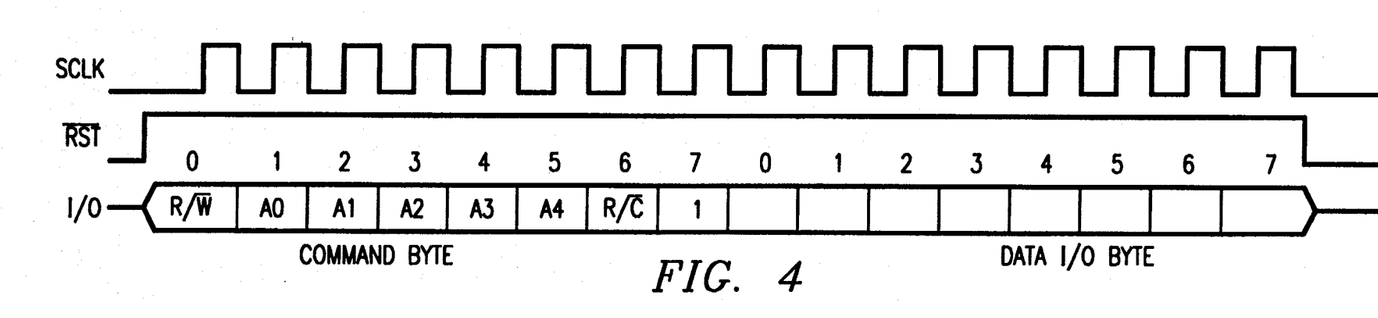
FIG. 4 shows single byte transfer.
Figure 5:
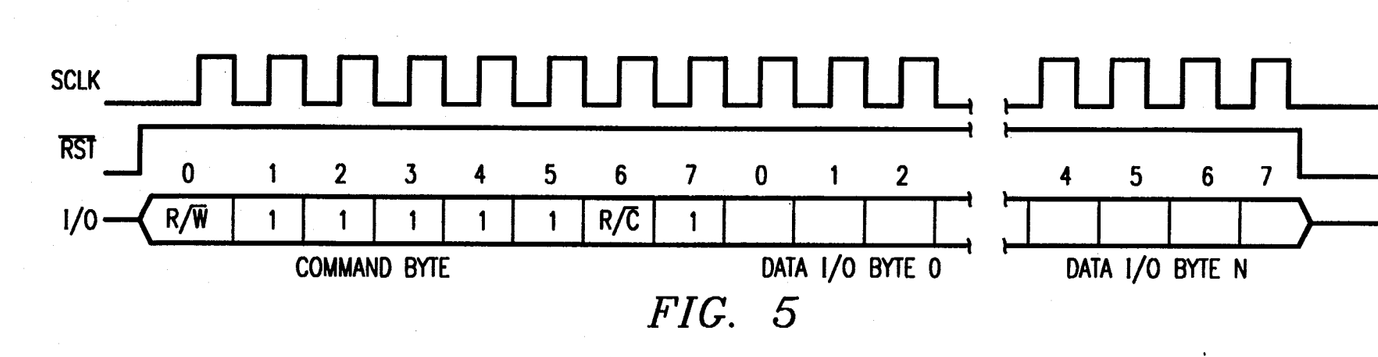
FIG. 5 shows burst mode transfer.
Figure 6:
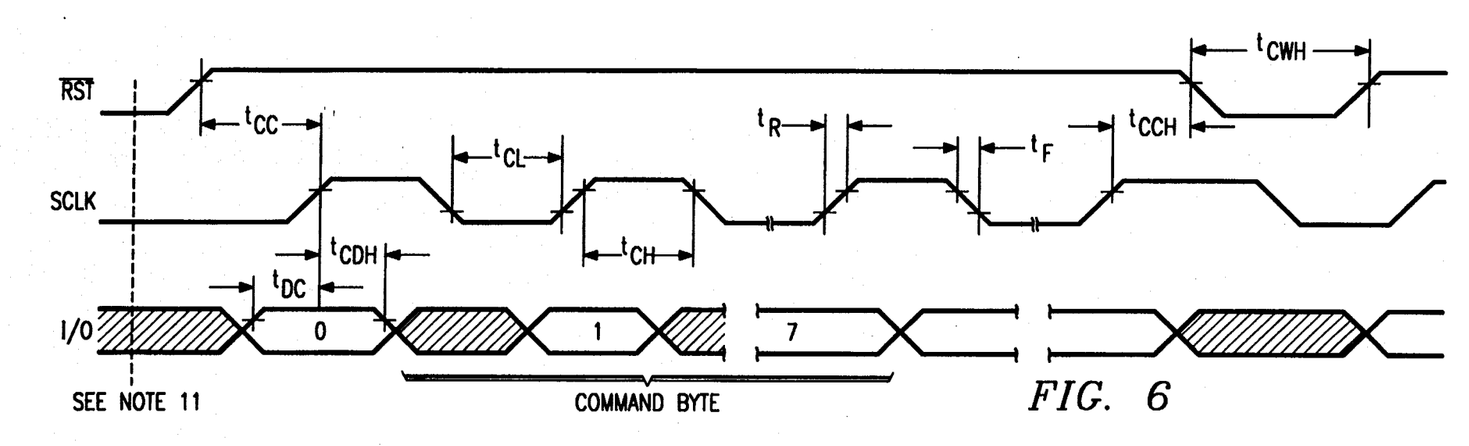
FIG. 6 shows write data transfer.
Figure 7:
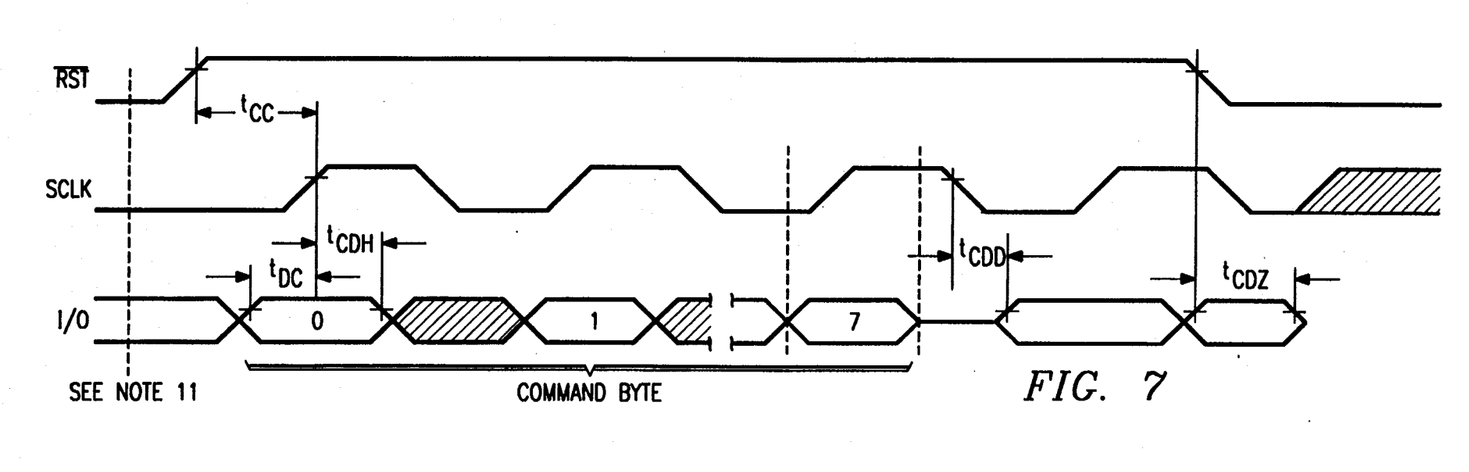
FIG. 7 shows a read data transfer.

All data transfers are initiated by driving the RST* input high. The RST* input serves two functions. First, RST* turns on the control logic which allows access to the shift register for the address/command sequence. Second, the RST* signal provides a method of terminating either single byte or multiple byte data transfer. A clock cycle is a sequence of a falling edge followed by a rising edge. For data inputs, data must be valid during the rising edge of the clock and data bits are output on the falling edge of clock. All data transfer terminates if the RST input is low and the I/O pin goes to a high impedance state. Data transfer is illustrated in FIGS. 4–7: FIG. 4 shows single byte transfer; FIG. 5 shows burst mode transfer; FIG. 6 shows write data transfer; and FIG. 7 shows a read data transfer.

Data Input

Following the eight SCLK cycles that input the write mode command byte a data byte is read on the rising edge of the next eight SCLK cycles. Additional SCLK cycles are ignored should they inadvertently occur.

Data Output

Following the eight SCLK cycles that input the read mode command byte a data bit is read out on the falling edge of the next eight SCLK cycles. Note that the first data bit to be transmitted from the clock/RAM occurs on the first falling edge after the last bit of the command byte is written. Additional SCLK cycles retransmit the data bytes should they inadvertently occur so long as RST remains high. This operation permits continuous burst read mode capability.

Clock/calendar

The Clock/Calendar is contained in eight writable/readable registers as shown in Table 2. Data contained in the clock/calendar registers is in binary coded decimal format (BCD).

always read a zero when read. Bit 7 is set to logical one on power up and before any write operation to CLK or RAM, bit 7 must be set to zero. When high, the write protect bit prevents a write operation to any other register.

Clock/Calendar Burst Mode

The clock/calendar command byte specifies burst mode operation. In this mode the eight clock/calendar registers may be consecutively read or written.

TABLE 2

| REGISTER ADDRESS | REGISTER DEFINITION |
|---|---|
| A CLOCK | |
| SEC: bits 7-0 = 1 0 0 0 0 0 0 RD/W̄ | 00-59: CH \| 10 SEC \| SEC |
| MIN: 1 0 0 0 0 0 1 RD/W̄ | 00-59: 0 \| 10 MIN \| MIN |
| HR: 1 0 0 0 0 1 0 RD/W̄ | 01-12 / 00-23: 12/24 \| 0 \| 10 A/P \| HR \| DATE |
| DATE: 1 0 0 0 0 1 1 RD/W̄ | 01-30 / 01-31: 0 \| 0 \| 10 DATE \| DATE |
| MONTH: 1 0 0 0 1 0 0 RD/W̄ | 01-12: 0 \| 0 \| 0 \| 10 M \| MONTH |
| DAY: 1 0 0 0 1 0 1 RD/W̄ | 01-07: 0 \| 0 \| 0 \| 0 \| 0 \| DAY |
| YEAR: 1 0 0 0 1 1 0 RD/W̄ | 0-99: 10 YEAR \| YEAR |
| CONTROL: 1 0 0 0 1 1 1 RD/W̄ | WP \| FORCED TO ZERO |
| CLOCK BURST: 1 0 0 0 1 1 1 RD/W̄ | |
| B RAM | |
| RAM 0: 1 1 0 0 0 0 0 RD/W̄ | RAM DATA 0 |
| ⋮ | ⋮ |
| RAM 23: 1 1 1 1 1 1 1 RD/W̄ | RAM DATA 23 |
| RAM BURST: 1 1 1 1 1 1 1 RD/W̄ | |

Clock Halt Flag

Bit 7 of the seconds register is defined as the clock halt flag. When this bit is set to logic one, the clock oscillator is stopped and the serial timekeeper chip is placed into a low power standby mode with a current drain of not more than 1.0 microamp. When this bit is written to logical zero, the clock will start.

AM-PM/12-24 Mode

Bit 7 of the hours register is defined as the 12- or 24-hour mode select bit. When high, the 12-hour mode is selected. In the 12-hour mode, bit 5 is the AM/PM bit with logic high being PM. In the 24-hour mode, bit 5 is the second 10 hour bit (20+ hours).

Write Protect Register

Bit 7 of write protect register is the write protect bit. The first seven bits (bits 0-6) are forced to zero and will

RAM

The Static RAM is 24×8 bytes addressed consecutively in the RAM address space.

RAM Burst Mode

The RAM command byte specifies burst mode operation. In this mode, the 24 RAM registers may be consecutively read or written.

Register Summary

A register data format summary is shown in Table 2, above.

Crystal Selection

A 32.768 kHz crystal, Daiwa Part No. DT268, Seiko Part No. DS-VT-200 or equivalent, can be directly connected to the serial timekeeper chip via pins 2 and 3

(X1, X2). The crystal selected for use should have a specified load capacitance ($C_L$) of 6 pF.

Detailed Parameters

The following tables give specific values for some of the voltage and timing parameters just referred to, as used in the specific context of the presently preferred embodiment. It must be understood that these specific values are given merely to provide a wealth of detail regarding the described chip embodiment, and do not by any means delimit necessary features of the invention.[6]

| ABSOLUTE MAXIMUM RATINGS: | | | | | | |
|---|---|---|---|---|---|---|
| VOLTAGE ON ANY PIN RELATIVE TO GROUND | | | | −0.5 V TO +7.0 V | | |
| OPERATING TEMPERATURE | | | | 0° C. TO +70° C. | | |
| STORAGE TEMPERATURE | | | | −55° C. TO +125° C. | | |
| SOLDERING TEMPERATURE | | | | 260° C. FOR 10 SEC | | |
| PARAMETER | SYMBOL | MIN | TYP | MAX | UNITS | NOTES |
| RECOMMENDED D.C. OPERATING CONDITIONS (0° to ±70° C.) | | | | | | |
| Supply Voltage | $V_{CC}$ | 4.5 | 5.0 | 5.5 | VOLTS | 1 |
| Standby Supply Voltage | $V_{CC1}$ | 3.0 | | 5.5 | VOLTS | 1 |
| Logic 1 Input | $V_{IH}$ | 2.0 | | $V_{CC}$ | VOLTS | 1 |
| Logic 0 Input | $V_{IL}$ | −0.5 | | 0.8 | VOLTS | 1 |
| DC Electrical Characteristics (0° to +70° C., $V_{CC}$ = 5 V ± 10%) | | | | | | |
| Input Leakage | $I_{LI}$ | | | +500 | μA | 6 |
| I/O Leakage | $I_{LO}$ | | | +500 | μA | 6 |
| Logic 1 Output | $V_{OH}$ | 2.4 | | | VOLTS | 2 |
| Logic 0 Output | $V_{OL}$ | | | 0.4 | VOLTS | 3 |
| Active Supply Current | $I_{CC}$ | | | 4 | mA | 4 |
| Standby Supply Current | $I_{CC1}$ | | | 1 | μA | 5 |
| Standby Supply Current | $I_{CC2}$ | | | 100 | nA | 10 |
| CAPACITANCE ($T_A$ = 25° C.) | | | | | | |
| Input Capacitance | $C_I$ | | | 5 | pF | |
| I/O Capacitance | $C_{I/O}$ | | | 10 | pF | |
| Crystal Capacitance | $C_X$ | | | 6 | pF | |
| AC Electrical Characteristics ($V_{CC}$ = +5 V ± 10%, 0°–70° C.) | | | | | | |
| Data To CLK Setup | $t_{DC}$ | 50 | | | ns | 7 |
| CLK To Data Hold | $t_{CDH}$ | 70 | | | ns | 7 |
| CLK To Data Delay | $t_{CDD}$ | | | 200 | ns | 7, 8, 9 |
| CLK Low Time | $t_{CC}$ | 250 | | | ns | 7 |
| CLK High Time | $t_{CH}$ | 250 | | | ns | 7 |
| CLK Frequency | $f_{CLK}$ | D.C. | | 2.0 | MHz | 7 |
| CLK Rise & Fall | $t_F$ | | | 500 | ns | |
| RST To CLK Setup | $t_{CS}$ | 1 | | | us | 7 |
| CLK To RST Hold | $t_{CCH}$ | 60 | | | ns | 7 |
| RST Inactive Time | $t_{CWH}$ | 1 | | | us | 7 |
| RST To I/O High Z | $t_{CDZ}$ | | | 70 | ns | 7 |

NOTES TO THE TABLES:
[1.] All voltages are referenced to ground.
[2.] Logic one voltages are specified at a source current of 1 mA.
[3.] Logic zero voltages are specified at a sink current of 4 mA.
[4.] $I_{CC}$ is specified with the I/O pin open.
[5.] $I_{CC1}$ is specified with $V_{CC}$ at 3.0 volts and RST*, I/O, and SCLK are open.
[6.] RST*, SCLK and I/O all have 40 kΩ pull down resistors to ground.
[7.] Measured at VIH = 2.0 V or VIL = 0.8 V and 10 ms maximum rise and fall time.
[8.] Measured at VOH = 2.4 V or VOL = 0.4 V.
[9.] Load capacitance = 50 pF.
[10.] $I_{CC2}$ is specified with $V_{CC}$ at 3.0 volts and RST*, I/O, and SCLK are open. The clock halt flag must also be set to logic one.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested herein are merely illustrative. These examples may help to show some of the scope of the inventive concepts, but these examples do not nearly exhaust the full scope of variations in the disclosed novel concepts.

As will be recognized by those skilled in the art, the innovative concepts described in the present application can be modified and varied over a tremendous range of applications, and accordingly their scope is not limited except by the allowed claims.

What is claimed is:

1. A system, comprising:
an oscillator connected to provide a plurality of output pulses at a substantially regular interval;
a counter chain;
user memory connected to be read from or written to;
transfer logic coupling said user memory to said counter chain, said transfer logic configured to selectively transfer at least one bit of said user memory onto at least one corresponding bit location of said counter chain or to selectively transfer at least one bit of said counter chain onto at least one corresponding bit location of said user memory;
first delay circuitry coupled to receive said plurality of output pulses from said oscillator, said first delay circuitry generates a plurality of first delayed pulses corresponding to said plurality of output pulses, so that each first delayed pulse of said plurality of first delayed pulses corresponds to an output pulse of said plurality of output pulses, said first delay circuitry coupled to said counter chain to send said plurality of first delayed pulses to said counter chain in order to clock said counter chain;

second delay circuitry coupled to receive said plurality of first delayed pulses from said first delay circuitry, said second delay circuitry generates a plurality of second delayed pulses corresponding to said plurality of first delayed pulses, so that each second delayed pulse of said plurality of second delayed pulses corresponds to a first delayed pulse of said plurality of first delayed pulses, said second delay circuitry coupled to said transfer logic to send said plurality of second delayed pulses to said transfer logic in order to clock said transfer logic.

2. The system of claim 1, wherein said second delay circuitry adds an additional delay to each first delayed pulses of said plurality of first delayed pulses while generating said plurality of second delayed pulses, said additional delay being at least equal to a worst-case time required for said counter chain to stabilize.

3. The system of claim 1, wherein said transfer logic has an associated time to transfer information between said counter chain and said user memory and said first delay circuitry generates said first delayed pulse with a delay which is at least equal to said time.

4. The system of claim 1, wherein said second delay circuitry adds an additional delay having a range of 10–100 nanoseconds to each first delayed pulse of said plurality of first delayed pulses while generating said plurality of second delayed pulses.

5. The system of claim 1, wherein said first delay circuitry and said second delay circuitry are combined into one circuit.

6. The system of claim 1, wherein said first delay circuitry and said second delay circuitry are separate from one another.

7. The system of claim 1, wherein said oscillator comprises an analog oscillator and a divider circuit, said analog oscillator produces said output pulse(s) having a first frequency, said divider circuit connected to reduce said first frequency of said output pulse(s) to a second frequency, said second frequency less than said first frequency of said analog oscillator.

8. The system of claim 1, wherein said oscillator comprises an analog oscillator and a divider circuit, said analog oscillator to produce said output pulse(s) having a first frequency, said divider circuit connected to reduce said first frequency of said plurality of output pulses to less than 1000 Hz.

9. The system of claim 1, wherein said oscillator comprises an analog oscillator and a divider circuit, said analog oscillator to produce said plurality of output pulses having a first frequency, said divider circuit connected to reduce said first frequency of said plurality of output pulses to approximately 1 Hz.

10. The system of claim 1, wherein said oscillator, said counter chain, said user memory, said transfer logic, said first delay circuitry, and said second delay circuitry are integrated onto a single integrated chip, wherein said oscillator comprises an analog oscillator that is stabilized by an off-chip resonant crystal.

11. The system of claim 1, wherein said transfer logic suppresses transferring an output from said counter chain onto said corresponding bit location(s) of said user memory whenever, after said oscillator generates an output pulse of said plurality of output pulses, said second delayed pulse has not yet occurred.

12. The system of claim 1, further comprising an input/output buffer connected to provide a bidirectional data pathway to and from user memory of said system.

13. The system of claim 1, wherein said system is a timekeeping system.

14. The system of claim 1, wherein said plurality of output pulses generated by said oscillator is asynchronous.

15. The system of claim 1, wherein said user memory comprises a plurality of latches.

16. The system of claim 1, wherein said transfer logic is parallel so that transferring said bit(s) of said user memory onto corresponding bit locations of said counter chain is parallel and selective and said transfer of said bit(s) of said counter chain onto said corresponding bit locations of said user memory is parallel and selective.

17. The system of claim 1, wherein said oscillator is a circuit.

18. The system of claim 1, wherein delays added by said first delayed circuitry and said second delayed circuitry are independently adjustable.

19. The system of claim 1, wherein each second delayed pulse of said plurality of second delayed pulses has a greater delay with respect to each output pulse of said plurality of said output pulse, than each first delayed pulse of said plurality of first delayed pulses.

20. The system of claim 1, wherein said transfer of said bit(s) of said user memory onto corresponding bit locations of said counter chain and said transfer of said bit(s) of said counter chain onto said corresponding bit locations of said user memory occur on a rising edge of said output pulse(s).

21. The system of claim 1, wherein said counter chain is synchronous.

22. The system of claim 1, wherein said system is embodied in an integrated circuit.

23. The system of claim 1, wherein said first delay circuitry comprises at least three inverters coupled together in series and said second delay circuitry comprises at least two inverters coupled together in series.

24. A doubled-buffered system for timekeeping systems, comprising:
- an oscillator to provide a plurality of output pulses at a substantially regular interval;
- a counter chain;
- user memory, said user memory being read from or written to;
- transfer logic coupling said user memory to said counter chain, said transfer logic alternatively transferring at least one bit of said user memory onto at least one corresponding bit location of said counter chain or transferring at least one bit of said counter chain onto at least one corresponding bit location of said user memory;
- first delay circuitry coupled to receive said plurality of output pulses from said oscillator, said first delay circuitry generating a plurality of first delayed pulses corresponding to said plurality of output pulses, so that each first delayed pulse of said plurality of first delayed pulses corresponds to an output pulse of said plurality of output pulses, said first delay circuitry being coupled to said counter chain to send said plurality of first delayed pulses to said counter chain in order to clock said counter chain; and
- second delay circuitry coupled to receive said plurality of first delayed pulses from said first delay circuitry, said second delay circuitry generating a plurality of delayed pulses corresponding to said plurality of first delayed pulses, so that each second delayed pulse of said plurality of second delayed pulses corresponds to a first delayed pulse of said plurality of first delayed pulses, said second delay circuitry being coupled to said transfer logic to send said plurality of second delayed pulses to said transfer logic in order to clock said transfer logic.

25. The system of claim 24, wherein said second delay circuitry adds an additional delay to each first delayed pulse of said plurality of first delayed pulses while generating said plurality of second delayed pulses, said additional delay being at least equal to a worst-case time required for said counter chain to stabilize.

26. The system of claim 24, wherein said transfer logic has an associated time to transfer information between said counter chain and said user memory and said first delay circuitry generates said plurality of first delayed pulse by adding a time delay which is at least equal to said time.

27. The system of claim 24, wherein said second delay circuitry adds an additional delay having a range of 10-100 nanoseconds to each first delayed pulse of said plurality of first delayed pulses while generating said plurality of second delayed pulses.

28. The system of claim 24, wherein said first delay circuitry and said second delay circuitry are combined into one circuit.

29. The system of claim 24, wherein said first delay circuitry and said second delay circuitry are separate from one another.

30. The system of claim 24, wherein said oscillator comprises an analog oscillator and a divider circuit, said analog oscillator producing said plurality of output pulses having a first frequency, said divider circuit being coupled to receive said plurality of output pulses from said analog oscillator, said divider circuit reducing said first frequency of said output pulse(s) to a second frequency, said second frequency being less than said first frequency of said analog oscillator.

31. The system of claim 30, wherein said divider circuit is configured to reduce said first frequency of said plurality of output pulses to less than 1000 Hz.

32. The system of claim 30, said divider circuit being configured to reduce said first frequency of said plurality of output pulses to approximately 1 Hz.

33. The system of claim 24, wherein said oscillator, said counter chain, said user memory, said transfer logic, said first delay circuitry, and said second delay circuitry are integrated onto a single integrated chip, and wherein said oscillator comprises an analog oscillator that is stabilized by an off-chip resonant crystal.

34. The system of claim 24, wherein said transfer logic suppresses transferring an output from said counter chain onto said corresponding bit locations of said user memory whenever said second delayed pulse has not yet occurred, after said oscillator generates an output pulse of said plurality of output pulses.

35. The system of claim 24, further comprising an input/output buffer connected to provide a bidirectional data pathway to and from user memory of said system.

36. The system of claim 24, wherein said plurality of output pulses generated by said oscillator is asynchronous.

37. The system of claim 1, wherein said user memory comprises a plurality of latches.

38. The system of claim 24, wherein said transfer logic is parallel so that transferring said bit(s) of said user memory onto corresponding bit locations of said counter chain is parallel and selective and said transfer of said bit(s) of said counter chain onto said corresponding bit locations of said user memory is parallel and selective.

39. The system of claim 24, wherein delays added by said first delay circuitry and said second delay circuitry are independently adjustable.

40. The system of claim 24, wherein each second delayed pulse of said plurality of second delayed pulses has a greater delay with respect to each output pulse of said plurality of said output pulse, than each first delayed pulsed of said plurality of first delayed pulses.

41. The system of claim 24, wherein said transfer of said bit(s) of said user memory onto corresponding bit locations of said counter chain and said transfer of said bit(s) of said counter chain onto said corresponding bit locations of said user memory occurs on a rising edge of said output pulses.

42. The system of claim 24, wherein said counter chain is synchronous.

43. The system of claim 24, wherein said first delay circuitry comprises at least three inverters coupled together in series and said second delay circuitry comprises at least two inverters coupled together in series.

* * * * *